(No Model.)
I. MOWDER.
SANDING DEVICE FOR CARS.
No. 519,818. Patented May 15, 1894.
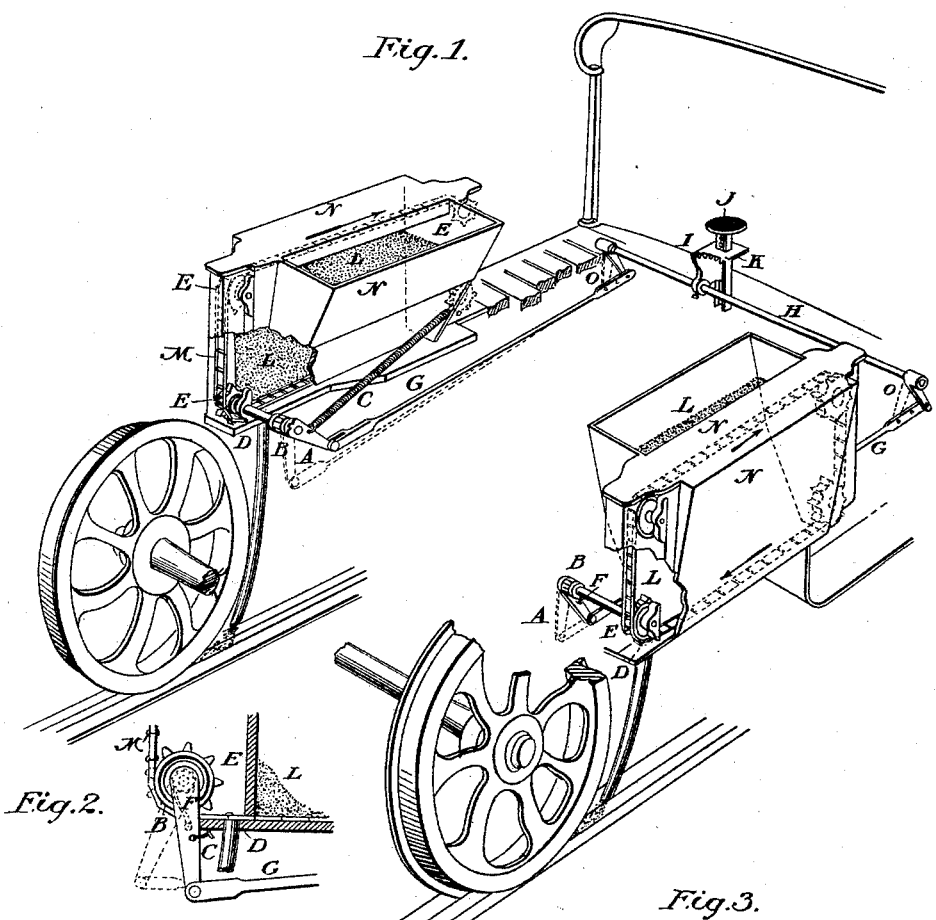
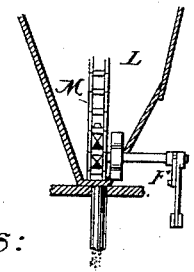
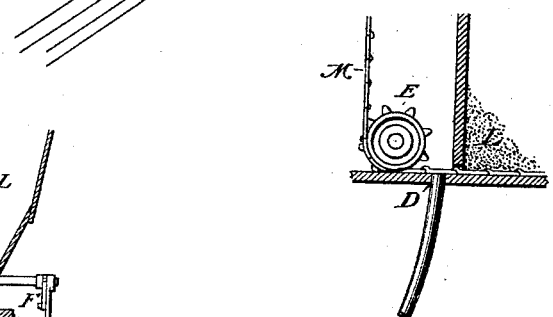
Witnesses:
Charles F. Ingersoll
R. M. Wanamaker
Inventor:
Isaac Mowder

UNITED STATES PATENT OFFICE.

ISAAC MOWDER, OF AKRON, ASSIGNOR OF ONE-HALF TO THOMAS H. MOWDER, OF YOUNGSTOWN, OHIO.

SANDING DEVICE FOR CARS.

SPECIFICATION forming part of Letters Patent No. 519,818, dated May 15, 1894.

Application filed September 30, 1893. Serial No. 486,920. (No model.)

*To all whom it may concern:*

Be it known that I, ISAAC MOWDER, a citizen of the United States, residing at Akron, in the county of Summit, State of Ohio, have invented certain new and useful Improvements in Sanding Devices, of which the following is a description and specification.

My invention relates to improvements in sanding devices having a rotary movement, as used for sprinkling or distributing sand, salt, or other substance, on rails of tracks on which street cars or similar vehicles are operated, for the purpose of producing an additional friction or resistance between rails and wheels of car and similar vehicles, enabling them to be operated successfully on icy and snow-covered tracks, or wherever additional friction is required. Prior inventions and improvements designed for similar service have, I believe, all been located beneath the floor of car where space is largely pre-occupied by car gearing; this device is to be placed on or above floor of car or similar vehicles; further, former sanding devices have had gearing chiefly located in sand-box proper, where gearing would be either more or less obstructed and worn, if not at times entirely clogged, especially when sand, salt, or other substance be wet or soggy. In former devices the conductor or sand tube, because of swaying or bounding of car in passing over rough or uneven track, or in rounding curves, has wholly or largely failed to follow the rail, distributing said sand, salt, or other substance inside or outside of rail. The aforesaid defects with minor other, I believe to be overcome by this simple, durable, economical, and easily operated machine, whether on street car, railway, or other similar tracks where additional friction need be produced to promote traction.

In order that my invention be more fully defined and explained, I refer to the different views and diagrams accompanying this specification and to each particular part comprising my combination in this piece of mechanism, as indicated by letters in specification referring to like letters in drawings.

Figure one (1) shows dash of car on platform. Fig. two (2) shows an open sectional view of ratchet, sprocket and sprocket chain movement. Fig. three (3) illustrates a sectional view of sprocket wheel and chain as operated, showing conductor D. leading down to rail. Fig. four (4) gives an open end and bottom view of sand-box and sprocket chain passing along bottom of sand-box proper.

My invention further consists in the combination and arrangement of parts as hereinafter set forth and claimed.

"A" represents the connection of ratchet arm B. and connecting rod G.

C. represents a spiral spring connecting arm B. with sand-box N. N.

D. represents the conductor or sanding pipe, leading sand from box N. N. to rail under wheel of car.

E. E. represent perpendicular chambers through which sprocket chain or conveyers pass up to top of box at front, and thence along through a continuous chamber on top of box N. N. to rear end, thence down perpendicular chamber to bottom of box where chain enters box at slot, as shown in Fig. four (4).

M. represents the sprocket chain as it passes from chamber E. E.

N. N. is the sand-box proper.

L. L. represents sand in box.

O. represents an arm connecting rod G. with main shaft H.

I. represents a sector attached to shaft H.

J. represents an upright sector which completes the entire gear with sand-box N. N. proper.

In the drawings and figures above referred to N. N. is a box of suitable size, made of wood, metal, or other material located on or above the floor of car or at any convenient point on similar vehicles or engines, and secured by any suitable fastening. Said box has sides slanting inward, thereby forming a narrow channel at bottom of box as shown in Fig. 4. Said box, commonly known as sand-box is to be filled with sand, salt or other substance suitable to produce friction between rails of track, and wheels of car, similar vehicles, or engines. The slots of sand-box are also shown in Fig. 4 and are of suitable size for entrance or exit of sprocket chain at bottom of sand-box, without allowing flow of sand when not in operation. At front and rear ends of sand-box and on outside of same are vertical chambers E. E. with two sprocket wheels in each chamber, one at top and other at bottom of each chamber. These chambers communicate with each other at the top by a continuous chamber passing along at top and outside of sand-box proper. At rear end of sand-box and at bottom, an endless sprocket chain or series of conveyers enter through a slot and passes along bottom of sand box through the sand, salt, or other substance, engaging same on its irregular surfaces, thence out through slot at bottom of front end; thence up through vertical chamber over sprocket wheels along through continuous chamber at top of sand-box; thence down vertical chamber at rear end over sprocket wheels therein, and entering sand-box as before; thus in conjunction with other gearing and attachments hereinafter described, producing a rotary movement of said sprocket chain or conveyers, this rotary movement of sprocket chain furnished with a series of links, disks, cups, or other irregular surfaces, causing such an agitation and engagement of said sand, salt, or other substance as to carry same through slot at front end of sand box into throat or conductor D.; thence down through conductor distributing same on rail, directly in front of wheels.

Conductor D. aforesaid consists of a funnel shaped spout or tube of suitable size and length made of rubber or other flexible material, the larger end of which is attached by any suitable fastening to front end of sand box proper in front of slot and below sprocket wheel, so as to receive sand, salt, or other substance that issues through slot. Said conductor projects downward from front of said sand box a sufficient length, compatible with the free vertical movement and function of conductor or sanding pipe hereinafter more fully set forth. The lower part of said conductor is held in place by a stationary attachment to and in front of break bar; said attachment being in the nature of a ring or other similar fastening suitable to allow free up and down movement of conductor through said ring or other similar fastening. The purpose to be accomplished by the shape, size, length and flexibility of said conductor, together with the stationary attachment to break bar just in front of wheels, in nature of a ring or similar fastening—permitting vertical movement aforesaid,—is to provide against a change of position of lower part of conductor with reference to being directly over rail, which would otherwise necessarily result from the swaying or bounding of car over rough or uneven tracks, or while rounding a curve. Said conductor as a part of this combination thus provides for a continuous force feed of sand, salt, or other substance directly on rail and just in front of wheel, regardless of track being rough, uneven or curved.

As a part of this combination requisite to perfect my sanding device, I have a ratchet and ratchet arm B. which connects sprocket shaft and connecting-rod G. joining latter at A. Connecting-rod G. extends from ratchet arm B. to arm O. which communicates with main shaft H. which latter is located or placed across platform of car under floor of same.

In the middle of main shaft H. is a sector I. connecting with upright rack J., thereby making a complete connection with sprocket gear on sand box proper. Downward pressure of foot on rack causes a forward movement of entire gear, spring C. reversing entire gear from ratchet back to its original position again, thereby affording a quick and reliable force feed of sand, salt, or other substance on rail in front of wheel.

I am aware that prior to my invention, sanding devices have been invented with the rotary movement, as effected by combination of sprocket wheels, chain and sand-box; but What I do claim, and desire to secure by Letters Patent, is—

1. The sand box N. N. having slanting sides and slots and provided with an endless sprocket chain, sprocket wheels, sprocket shaft, spring C, ratchet and means for revolving the sprocket shaft from the platform of the car by a reciprocating movement of the foot, substantially as described.

2. The combination with the sanding box having the slots for the passage of the sprocket chain and provided with the sprocket shafts, wheels and spring, of the rod G, arm O, shaft H, and means for reciprocating the shaft as described.

3. The combination in a sanding device of the following elements, to-wit: a slotted box having an endless sprocket chain, sprocket shafts and wheels, arm B, spring C, rod G, shaft H, sector I, rack J, and flexible conductor substantially as described.

4. The sand box provided with the endless sprocket chain, shafts, wheels, ratchet device on one of the shafts, and means for imparting direct rotary motion to the said shaft by a reciprocating device on the platform of the car all as set forth.

ISAAC MOWDER.

Witnesses:
CLARA A. TREAP,
ISAAC C. GIBBONS.